United States Patent [19]
Numata et al.

[11] Patent Number: 4,573,112
[45] Date of Patent: Feb. 25, 1986

[54] SWITCHING REGULATOR WITH A QUIESCENT TIME PERIOD

[75] Inventors: Kunio Numata, Fujisawa; Yoshiaki Nishiyama, Hiratsuka, both of Japan

[73] Assignee: NCR Corporation, Dayton, Ohio

[21] Appl. No.: 584,377

[22] Filed: Feb. 28, 1984

[30] Foreign Application Priority Data

Apr. 25, 1983 [JP] Japan .................................. 58-71549

[51] Int. Cl.$^4$ .............................................. H02M 5/45
[52] U.S. Cl. ......................................... 363/19; 363/97
[58] Field of Search .................. 363/19, 20, 21, 95, 363/97, 131

[56] References Cited

U.S. PATENT DOCUMENTS

| | | | |
|---|---|---|---|
| 3,504,263 | 3/1970 | Schaefer | 363/19 |
| 4,058,758 | 11/1977 | Peterson | 363/21 |
| 4,084,219 | 4/1978 | Furukawa et al. | 363/21 |
| 4,210,947 | 7/1980 | Koizumi | 363/21 |
| 4,378,586 | 3/1983 | Bete | 363/19 |
| 4,420,804 | 12/1983 | Nishino | 363/21 |

*Primary Examiner*—Patrick R. Salce
*Assistant Examiner*—D. L. Rebsch
*Attorney, Agent, or Firm*—Wilbert Hawk, Jr.; Richard W. Lavin

[57] ABSTRACT

A self-excited switching type D.C. power supply for producing a stabilized output signal. The power supply is provided with a rectifier, a primary winding of a transformer, a switching transistor and a resistor connected in series with one another between first and second input terminals of the power supply. The transformer is further provided with a secondary winding, a Zener diode, a capacitor and a resistor connected in series with a photocoupler. The photocoupler is connected in series with a pair of control transistors which control the operation of the switching transistor. The switching frequency of the switching transistor is stabilized by providing a quiescent time period during which the switching transistor is disabled.

7 Claims, 11 Drawing Figures

FIG. 3A
LOAD
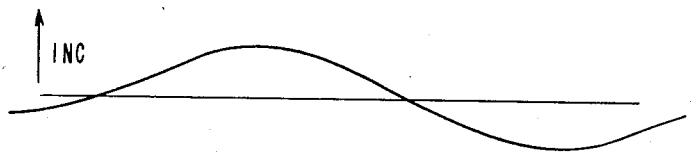
FIG. 3B
PRIOR ART
TRANSISTOR
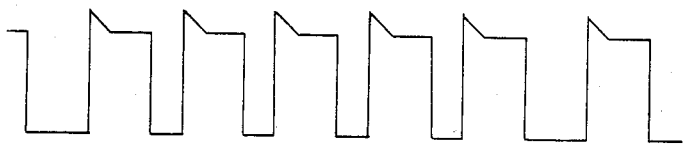
FIG. 3C
VCE
TRANSISTOR 88
FIG. 3D
TRANSISTOR 88
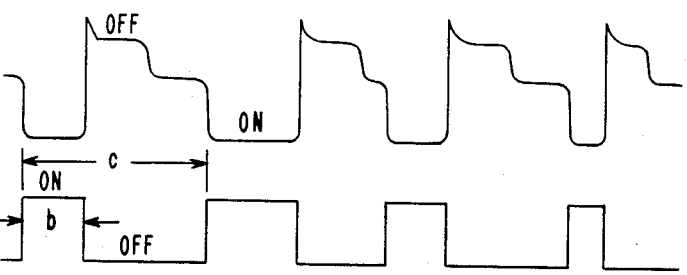
FIG. 3E
DIODE 96
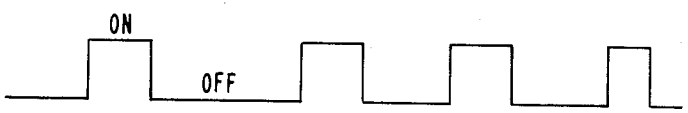
FIG. 3F
TRANSISTOR
110, 128
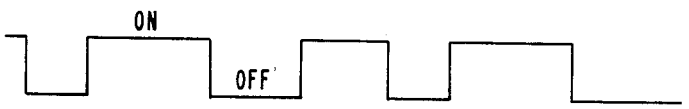
FIG. 3G
QUIESCENT TIME
FIG. 3H
RESISTOR 124
FIG. 3I
RESISTOR 134
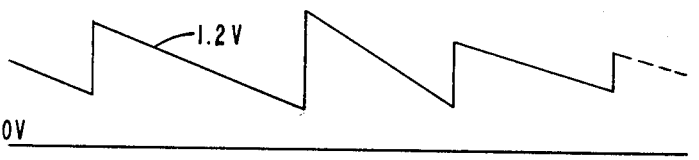

4,573,112

SWITCHING REGULATOR WITH A QUIESCENT TIME PERIOD

BACKGROUND OF THE INVENTION

This invention relates to switching-type power supplies and more particularly to a self-exciting switching D.C. stabilized power supply which utilizes feedback circuits for controlling the operating frequency of a switching transistor.

Switching D.C. stabilized power supplies are divided into self-excited and separately excited types. The latter type is usually powered with an independent oscillator section using dedicated integrated circuit elements for stabilizing the oscillating frequency but requires a separate power source for supplying voltage to the oscillation section and a choke coil on the output side of the power supply. The self-excited type of power supply is constructed to have a self-oscillating function, allowing the circuit to have a simple arrangement of parts which are fewer in number than the separately excited type, and is therefore lower in cost. Examples of this type of power supply may be found in U.S. Pat. Nos. 3,504,263 and 4,378,585.

In self-excited switching power supplies of the prior art, as the load increases, the on and off periods of the switching transistors are prolonged and consequently the oscillation period is prolonged; whereas, if the load decreases, the oscillation period is decreased. This fluctuation in the oscillation period requires high speed circuit elements which can deal with the changes in the oscillation frequency. The fluctuation in the oscillation period of the switching transistors also produces a wide band of switching noise which is also in the high frequency range. Such prior art construction of a power supply thus requires an extremely large size noise filter which increases the cost of the power supply. It is therefore a principal object of this invention to provide a self-excited switching D.C. power supply which overcomes the above-cited drawbacks of the prior art. It is a further object of this invention to provide a small size self-excited switching D.C. power supply in which the oscillating frequency of the switching transistor is kept stable, thereby restricting the switching noise to a narrow band as the load varies.

SUMMARY OF THE INVENTION

These and other objects of the invention are fulfilled by providing a self-exciting switching D.C. stabilized power supply which includes a switching transistor and the primary winding of a transformer which are wired in series across first and second input terminals of the power supply. A secondary winding of the transformer is coupled to first and second output terminals of the power supply by means of a diode rectifier which, when forward biased, transmits the D.C. signal to a variable load. A feedback circuit which includes a photocoupler is connected to the output terminals of the power supply for delaying the switching of the transistor in accordance with the load requirements to provide a quiescent period in the switching period of the transistor, during which time the transistor and the diode rectifier are in a non-conducting state. The on period of the switching transistor and the quiescent period are varied in accordance with the load to stabilize the switching frequency of the transistor.

BRIEF DESCRIPTION OF THE DRAWINGS

The foregoing and various other objects, advantages and meritorious features of the present invention will be apparent from the following detailed description when read in conjunction with the drawings, wherein like numerals identify corresponding elements.

FIGS. 3A-3I inclusive are voltage and operating waveforms associated with various elements of the power supply of the present invention.

DESCRIPTION OF THE PREFERRED EMBODIMENT

Figure 1:
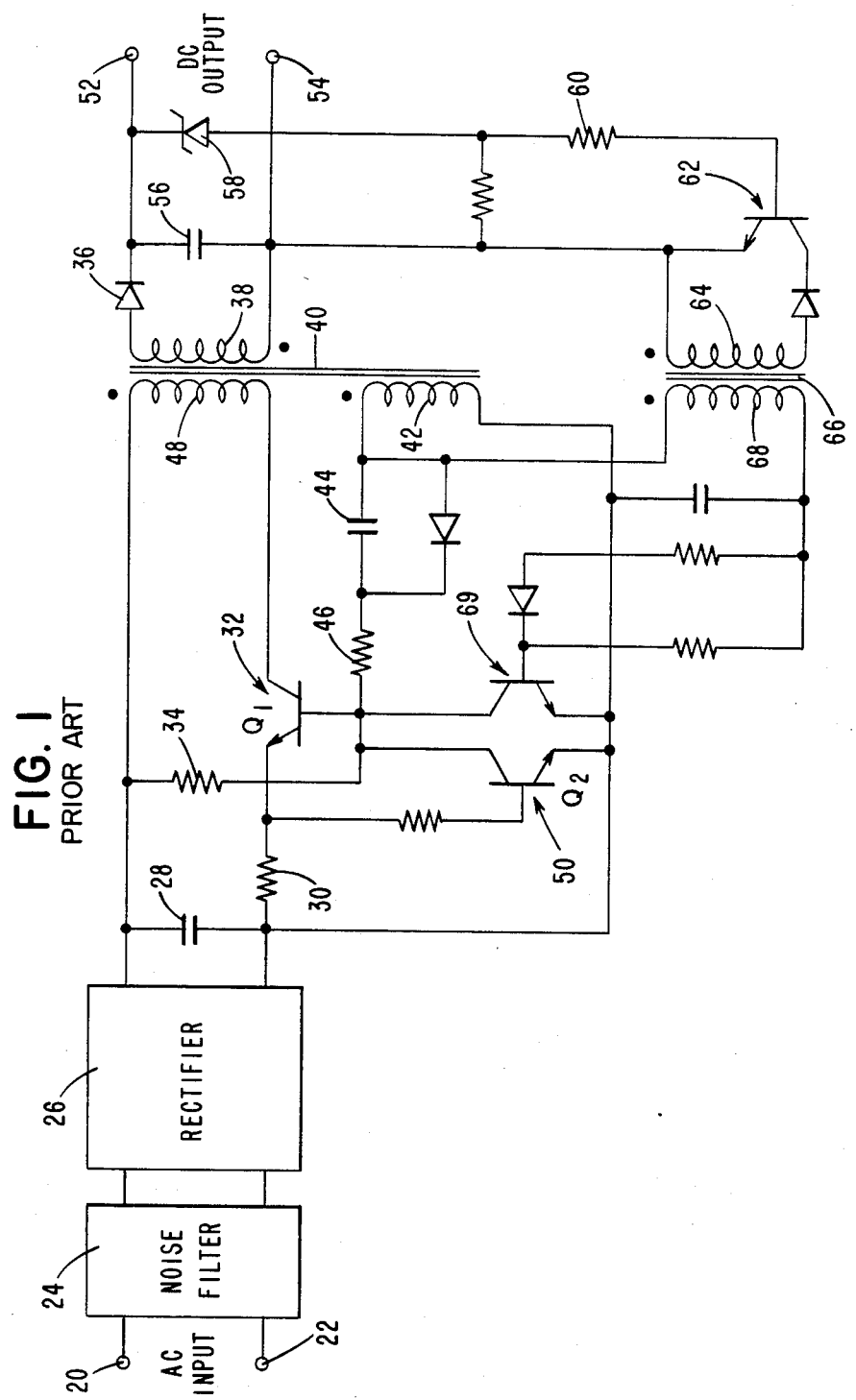
FIG. 1 is a schematic diagram of a typical prior art self-excited switching D.C. power supply.

Referring to FIG. 1, there is shown a schematic diagram of a prior art self-exciting switching D.C. power supply. In this type of power supply, application of an A.C. power signal to the input terminals 20, 22 through the noise filter 24 and the rectifier 26 results in the charging of the capacitor 28 which is discharged through the resistor 30 and the transistor 32 upon the conduction of the transistor 32 by the current supplied by the resistor 34. At this time, a diode 36 wired in series with the secondary winding 38 of a transformer 40 is reverse biased, preventing current from flowing through the secondary winding 38 of the transformer 40. The voltage induced in the second secondary winding 42 of the transformer 40 from the primary winding 48 will supply a base current to the transistor 32 through the capacitor 44 and resistor 46, rendering the transistor 32 fully conductive. As the voltage drop across the resistor 30 increases with time, it will reach a potential which causes a base current in transistor 50 to flow, thereby turning on such transistor 50 which in turn drops the base-emitter current of the transistor 32, thereby turning off the transistor 32. When transistor 32 is in the off state, the current flowing in the secondary winding 38 of the transformer 40 will forward bias the diode 36, allowing the voltage stored in the secondary winding 38 to be applied to the output terminals 52 and 54. The current will also charge the capacitor 56. When the electrical field across the primary winding 48 of the transformer 40 has completely collapsed, the voltage in the winding drops to zero, which reverse biases the diode 36, and the system returns to its original state where the operation is repeated.

Operation of the power supply in this manner increases the charge in the capacitor 56 until it exceeds the breakdown voltage of the Zener diode 58, resulting in current flowing through the resistor 60 to the base electrode of the transistor 62 for turning it on. The time that it takes the capacitor 56 to reach the breakdown voltage varies with the load. As the load increases, the time for the capacitor to reach the breakdown voltage increases. When the load decreases, the time decreases. The conducting of the transistor 62 results in current flowing through the primary winding 64 of the transformer 66 inducing a current to flow in the secondary winding 68 which renders the transistor 69 conductive, which removes the base current from the transistor 32 and turns it off. This turning on and off of the transistor 32 at a frequency which varies in accordance with variations in the load results in a widely varying voltage level producing switching noises which require a large size noise filter to remove. Contrary to this, the oscillation period of the transistor 32 of the present invention is kept stable regardless of the variation in the load and input. In addition, the switching of the transistor 32 is provided with a soft-turn on and soft-turn off operation which produces very little noise.

Figure 2:
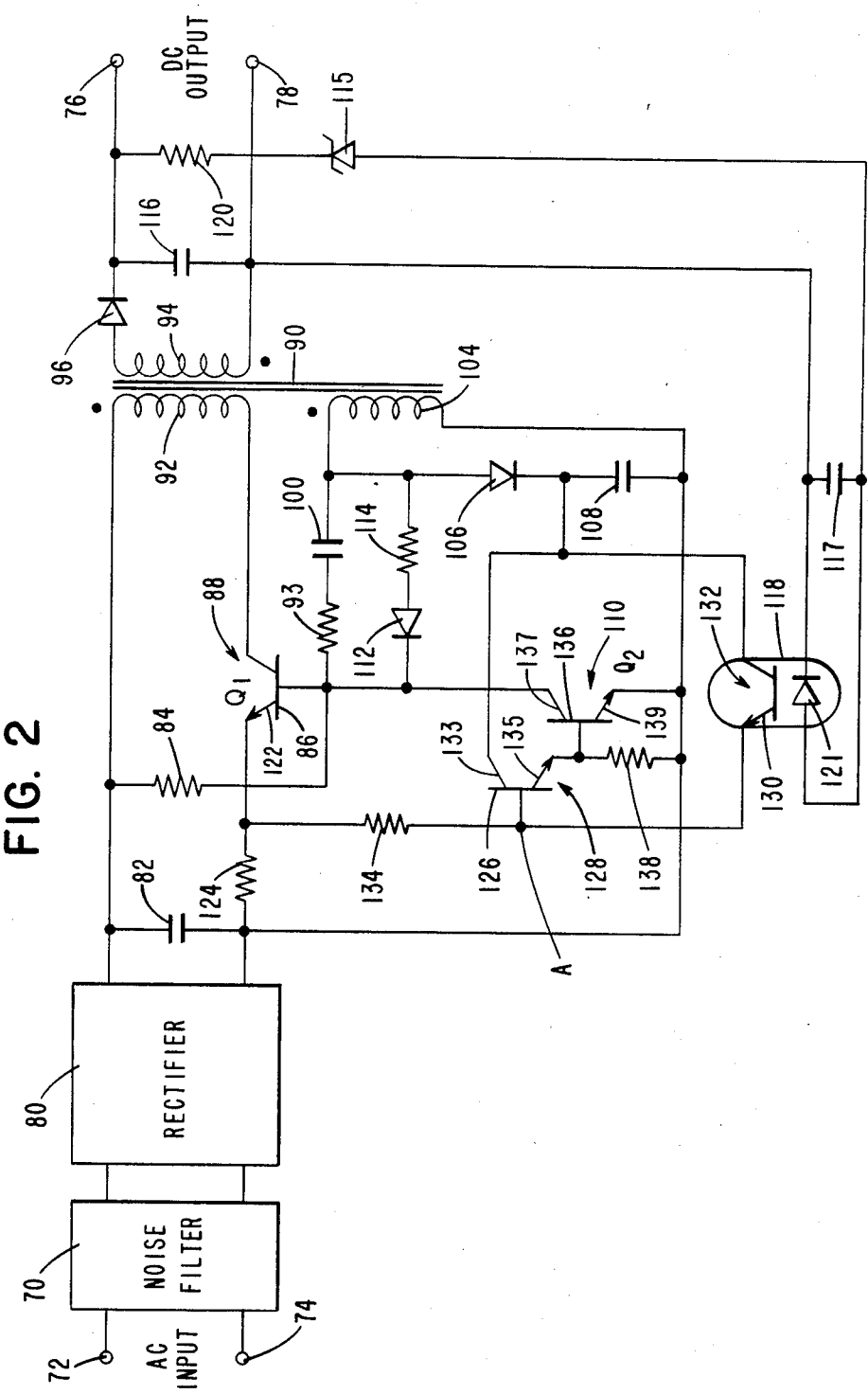
FIG. 2 is a schematic diagram of the self-excited switching D.C. power supply of the present invention.

Referring now to FIG. 2, there is shown a schematic diagram of the improved self-excited switching D.C. power supply of the present invention. The circuit includes a noise filter 70 shunted across the input terminals 72, 74 of the power supply to prevent external noise surges from appearing on the D.C. output terminals 76 and 78. A rectifier 80 rectifies the A.C. voltage appearing on the input terminals 72 and 74. A charging capacitor 82 is shunted across the rectifier 80 while a resistor 84 supplies a bias current to the base electrode 86 of an NPN switching transistor 88. This current is applied when a voltage is applied across the capacitor 82. A transformer 90 has the current flowing in the primary winding 92 in a direction opposite to the current flowing in the reverse secondary winding 94 as indicated by the dot. With this type of arrangement, a diode 96 in the secondary winding circuit is forward biased when the transistor 88 in the primary winding circuit is in an off state, enabling the energy stored in the primary winding 92 to be transferred through the secondary winding 94 to the output terminals 76 and 78. Since the primary winding 92 serves as a choke coil, no coil is needed in the secondary windings circuit.

Connected in series to the base electrode 86 of the transistor 88 is a resistor 93 and a capacitor 100 which absorb the kick voltage generated when the diode 96 is turned off. One side of the capacitor 100 is connected to one end of the second secondary winding 104 of the transformer 90. Shunted across the winding 104 are a diode 106 and a capacitor 108 which generate a stable D.C. voltage across the capacitor regardless of the on or off state of the transistor 88. This D.C. voltage supplies a bias current to a control transistor 110 in accordance with the D.C. output of the power supply. Further included in the circuit is a diode 112 and a resistor 114 for regulating the output power signals. A feedback circuit includes a Zener diode 115, whose breakdown voltage is set at a level somewhat lower than the D.C. output of the power supply, capacitors 116, 117, a photocoupler 118 and a resistor 120. The photocoupler serves to smooth the feedback voltage in stabilizing the D.C. output. The breakdown voltage of the Zener diode 115 determines the D.C. output of the power supply and the resistor 120 regulates the current in a light emitting diode portion 121 of the photocoupler 118.

Connected to the emitter electrode 122 of the transistor 88 is a resistor 124 which regulates the maximum current through the switching transistor 88 for controlling the maximum power outputted by the power supply. Connected between one end of the resistor 124 and the base electrode 126 of a control transistor 128 and the emitter electrode 130 of a phototransistor portion 132 of the photocoupler 118 is a resistor 134. As will be described more fully hereinafter, the resistor 134 regulates the base current in the transistor 88 and the time the transistor 88 is turned on. Connected to the base electrode 136 of the control transistor 110 is a resistor 138 for controlling the switching frequency of the transistor 88. The larger the value of the resistor 138, the lower the switching frequency of the transistor 88 and vise versa.

There will now be described the operation of the power supply of the present invention. Upon the application of an A.C. power signal to the input terminals 72 and 74, the noise filter 70 will filter out any noise in the signals, rectifier 80 will rectify the A.C. signals, and the capacitor 82 will start charging. The D.C. voltage generated in the capacitor 82 is applied through resistor 124 across the emitter and collector electrodes of the transistor 88. During this time, a current is applied to the base electrode 86 of the transistor 88 through the resistor 84 which starts rendering the transistor 88 conductive, enabling the capacitor 82 to discharge a voltage through resistor 124 and transistor 88 to the primary winding 92 of the transformer 90. The application of voltage to the winding 92 induces a corresponding voltage in the secondary windings 94 and 104 of transformer 90. The voltage induced in secondary winding 104 charges the capacitor 108 through diode 106 and supplies current to the base electrode 86 of the transistor 88 through resistor 114 and diode 112, which renders the transistor 88 fully conductive. At this time, the voltage induced in the winding 94 of transformer 90 will reverse-bias the diode 96, preventing any current from flowing to the output portion of the power supply. The charging of the capacitor 108 supplies a bias voltage to the phototransistor portion 132 of the photocoupler 118.

As the current increases in the input portion of the power supply as a result of the transistor 88 being in an on state, the voltage drop across the resistor 124 (FIG. 3H), will start to increase. With current flowing through the phototransistor 132 because of the charging of capacitor 108, the voltage drop across resistor 134 (FIG. 3I) increases, resulting in an increase in the potential at node A until it exceeds 1.2 volts, at which time current in the base electrode 126 of transistor 128 occurs, thereby turning on the transistor. The conduction of the transistor 128 supplies a current through the emitter electrode 135 thereof to the base electrode 136 of transistor 110 and through the resistor 138, thus enabling the transistor 110. The conduction of transistor 110 drops the base-emitter potential of transistor 88 through the collector 137 and emitter electrodes 139, which reduces the base current in the transistor, turning it off. The turning off of the transistor 88 collapses the magnetic field built up across the primary winding 92 of the transformer 90, inducing a reverse current in the secondary winding 94 which forward biases the diode 96 and allows current to flow through the output terminals 76 and 78 of the power supply. As part of this operation, the capacitor 116 is partially charged, which increases the current flow through the photodiode portion 121 of the photocoupler 118, resulting in an increase in the conduction state of the phototransistor 122, thereby maintaining the transistors 110 and 128 in an on state.

After the magnetic field in the primary winding 92 of the transformer 90 has collapsed, the capacitor 116 is discharged, reducing the potential at node A by reducing the voltage drop across resistor 134, which turns off transistors 110 and 128 and turns on the transistor 88. The potential appearing at capacitor 116 depends on the load connected to the power supply. Under a heavy load (FIG. 3A), the discharge of the capacitor 116 occurs at a rapid rate, turning off the transistors 110, 128 (FIG. 3F) and turning on the transistor 88 (FIG. 3D) at a rapid rate. Under a light load, the time for discharging the capacitor 116 is increased so that the transistors 110 and 128 are held in a conducting state for a longer period of time after the diode 96 (FIG. 3E) has been turned off. The period during which both the transistor 88 and the diode 96 are off is defined as the quiescent time, being indicated by "a" in FIG. 3G. As can be seen by comparing FIG. 3A with FIG. 3G, the quiescent time is shorter under a heavy load and longer under a light load. Since the time the transistor 88 is conducting, as indicated by "b" in FIG. 3D, increases as the load increases and decreases as the load decreases, the overall period of oscillation of the transistor 88, as indicated by "c" in FIG. 3D, remains essentially the same under both no-load and maximum load operating conditions. This condition allows the noise frequency generated by the switching of the transistor 88 to be retained within a very narrow band, allowing a low cost filter to be used. In contrast with this arrangement, prior self-excited power supplies (FIG. 3B) employing conventional ringing-choke converters vary the oscillation frequency in accordance with variations in load and input so that a frequency band of noise is produced which varies between 20 and 150 KHz, thus requiring expensive wide band noise filters.

The conditions under which the generation of the quiescent time portion of the transistor 88 operation occurs are as follows. When the power supply is subjected to a heavy load, the time it takes for the Zener diode 115 (FIG. 2) to reach its breakdown voltage is increased. During this time period, the capacitor 116 is being charged. When the voltage charge of the capacitor 116 exceeds the breakdown voltage of the diode 115, current flows through the resistor 120, the diode 115 and the capacitor 117, charging the capacitor. The charging of the capacitor 117 forward-biases the light emitting diode portion 121 of the photocoupler 118 causing the phototransistor portion 132 of the photocoupler 118 to become more conductive. The emitter-collector voltage developed in the phototransistor portion 132 is applied to the resistor 134. This action increases the potential at node A (FIG. 2) to 1.2 volts, turning on the control transistors 110 and 120, resulting in the turning off of the transistor 88 in a manner previously described. It is obvious that if the power supply is subjected to a light load, the time for the diode 115 to reach its breakdown voltage is reduced, thus shortening the time the transistor 88 is on. This condition is shown in FIG. 3D of the drawing.

Upon the transistor 88 being turned off, the diode 96 is forward-biased to release the energy stored in the primary winding 92 of the transformer 90, resulting in a charging of the capacitor 116 in the manner explained previously. Although the voltage drop across the resistor 124 decreases (FIG. 3H) as a result of the transistor 88 being in a non-conductive state, the potential at node A (FIG. 2) remains at a level sufficient to keep the control transistors 110 and 128 in a conducting state due to the discharge of the capacitor 116 through the photodiode portion 121 of the photocoupler 118, thus increasing the voltage drop across the resistor 134 (FIG. 3I). Upon the completion of the discharge of the capacitor 116, the potential at node A is reduced due to the reduction of the voltage drop across the resistor 134 (FIG. 3I), which turns off the control transistors 110 and 128 (FIG. 3F) enabling the transistor 88 to be turned on in the manner described previously. The time it takes for the capacitor 116 to be discharged is dependent on the load. A heavy load rapidly discharges the capacitor 116, which shortens the quiescent time period while a light load slows the discharge prolonging the quiescent time period. Thus, it will be seen that both the on-time portion of the transistor 88 and the quiescent time period vary according to the load applied to the power supply; however, the overall cycle of operation of the transistor 88 remains the same as shown in FIG. 3D by the letter "c". This arrangment provides the transistor 88 with a relatively stable switching frequency regardless of the load applied, thereby reducing the noise level produced by such switching operations and allowing for low cost noise filters to be employed.

While a particular embodiment of the invention has been shown and described, various modifications thereof will become apparent to those skilled in the art and, therefore, it is not intended that the invention be limited to the disclosed embodiment or to details thereof, and departures may be made therefrom within the spirit and scope of the invention, as defined in the appended claims.

We claim:

1. A switching regulator of the type having an input circuit for receiving an A.C. signal, a rectifier in series with the input circuit, first switching means connected in series with the input circuit and the primary winding of a transformer for transmitting the output of the rectifier to the primary winding of the transformer when enabled, the transformer having a reversed secondary winding connected to a diode and first and second output terminals of the regulator, the diode being operated upon the disabling of the first switching means to transmit the output of the rectifier from the secondary winding to the output terminals, the regulator further comprising;

second switching means connected to the first switching means for disabling said first switching means and enabling the output of the rectifier to be transmitted to the output terminals of the regulator upon operation of said second switching means;

means connected to said first switching means for supplying a biasing voltage to said second switching means for operating said second switching means after said first switching means has been enabled for a predetermined time period;

capacitor means connected to the output of the secondary winding in chargeable relation thereto, said capacitor means being discharged within a time period which varies in accordance with the level of the load applied to the output terminals;

and a control circuit including a photocoupler having an optical electronic coupling device diode portion connected in series to said capacitor means and a transistor portion connected in series with the second switching means and to said output terminals for sensing the voltage level of the rectifier output transmitted to the output terminals, said circuit further including a Zener diode connected in series with said capacitor means and said coupling device diode portion for enabling the capacitor means to supply a biasing voltage to said second switching means upon sensing a predetermined voltage level at said output terminals whereby the second switching means is operated to disable the operation of the first switching means during a time period which varies in accordance with the level of the load.

2. The switching regulator of claim 1 in which said supplying means includes a first capacitor shunted across the rectifier in a charging relation, a first resistor connected in series with the first capacitor and the first switching means and a second resistor connected in series with the first resistor and the second switching means for supplying a biasing voltage supplied from said first capacitor to said second switching means upon the enabling of said first switching means.

3. The switching regulator of claim 2 in which the transformer includes a feedback winding, the regulator further including a second capacitor shunted across the feedback winding of the transformer in a charging relation, and the second capacitor being connected in series with the transistor portion of the photocoupler for supplying a biasing voltage to the transistor portion upon the disabling of the first switching means.

4. A switching regulator for supplying D.C. power to a variable electrical load having an input circuit for receiving an A.C. signal, a rectifier in series with the input circuit, a switching transistor having a control electrode, an input electrode connected to the input circuit and an output electrode connected to a first winding of a transformer for transmitting the output of the rectifier to the first winding when the transistor is in an ON cycle of operation, the transformer having second and third windings with the second winding being reversed to the first winding and connected to a diode and first and second output terminals across which the load is connected, the diode being disabled during the ON cycle of the switching transistor and enabled during the OFF cycle of the transistor to transmit the output of the rectifier from the second winding of the transformer to the output terminals, the regulator further including;

a first control transistor having an input electrode, a control electrode and an output electrode connected to the control electrode of the switching transistor for disabling the switching transistor when enabled;

a second control transistor having an input electrode, a control electrode and an output electrode connected to the control electrode of the first control transistor;

a first resistor connected in series with the input circuit and the control electrode of the switching transistor for biasing the switching transistor to an ON cycle of operation;

a first capacitor shunted across the output of the second winding and being charged upon the enabling of the diode to transmit the output of the rectifier to the output terminals;

and a control circuit including a second resistor, a Zener diode and a photocoupler connected in series with the first capacitor and the control electrode of the second control transistor for discharging the first capacitor through the photocoupler upon the first capacitor's charging to the breakdown voltage of the Zener diode wherein the photocoupler is energized to keep the first and second control transistors conducting until the first capacitor is discharged thereby delaying the operation of the switching transistor.

5. The regulator of claim 4 which includes a second capacitor shunted across the third winding and connected in series with the photocoupler and the input and control electrodes of the second control transistor for maintaining the first and second control transistors and the photocoupler in an enabled condition upon the disabling of the switching transistor.

6. The regulator of claim 5 in which the photocoupler includes a transistor portion connected in series with the input electrode and the control electrode of the second control transistor, the regulator further including a second resistor connected in series with the transistor portion of the photocoupler and the control electrode of the second control transistor for supplying an enabling signal to the first and second control transistors in response to current flowing through the transistor portion of the photocoupler.

7. The regulator of claim 6 in which the photocoupler further includes an optical electronic coupling device diode portion associated with said transistor portion, said coupling device diode portion being connected in series with the first capacitor, the Zener diode and a third resistor for enabling current to flow through the transistor portion of the photocoupler in response to the discharge of the first capacitor.

* * * * *